United States Patent [19]

Spears, Jr.

[11] 4,226,084
[45] Oct. 7, 1980

[54] DUCTED FAN ENGINE EXHAUST MIXER

[75] Inventor: Esten W. Spears, Jr., Indianapolis, Ind.

[73] Assignee: General Motors Corporation, Detroit, Mich.

[21] Appl. No.: 58,127

[22] Filed: Jul. 24, 1970

[51] Int. Cl.³ .......................... F02K 3/06; F02K 1/26
[52] U.S. Cl. ...................................... 60/262; 60/264; 60/266
[58] Field of Search .......................... 60/262, 264, 266

[56] References Cited

U.S. PATENT DOCUMENTS

| 3,100,627 | 4/1963 | Wilde | 60/261 |
| 3,196,609 | 7/1965 | Ingram et al. | 60/262 |
| 3,377,804 | 4/1968 | Wright et al. | 60/262 |

Primary Examiner—Stephen C. Bentley
Attorney, Agent, or Firm—Paul Fitzpatrick

[57] ABSTRACT

A turbofan engine has an exhaust arrangement for the bypassed air and turbine exhaust gases providing for mixing of the two before a common propulsion nozzle. The turbine exhaust gas is directed to a number of circumferentially spaced exhausts, the outlets of which are inclined to the axis of the engine. A baffle extending from the end of the bypass duct into the common exhaust duct divides the bypass air into a portion inside and a portion outside of the baffle, the former mixing initially with the turbine exhaust gases and the resulting mixture then being mixed with the remainder of the bypass air. The baffle includes lobes which extend downstream and inwardly so as to obscure the outlets of the turbine exhaust from the jet nozzle, thus minimizing thermal radiation through the nozzle.

3 Claims, 3 Drawing Figures

DUCTED FAN ENGINE EXHAUST MIXER

"The invention herein described was made in the course of work under a contract or subcontract thereunder with the Department of Defense."

DESCRIPTION

My invention relates to improvements in exhaust systems for engines of the turbofan or bypass type in which a gas turbine engine drives a fan which propels a substantial volume of air past the turbine engine and in which the exhaust from the turbine and the air flowing through the bypass duct are mixed and supplied to a common propulsive jet nozzle.

It is desirable for maximum efficiency of such engines to accomplish efficiently thorough mixing of the turbine exhaust and bypass flow upstream of the jet nozzle. Various types of mixers for this purpose have been proposed, one being described and claimed in my U.S. Pat. No. 3,273,345 issued Sept. 20, 1966.

It may be desirable in turbojet engines of any type, including turbofan engines, to minimize infrared radiation from the hot parts of the turbine through the propulsive nozzle. The reasons for this, and one arrangement for accomplishing such a result, are explained in Smale U.S. Pat. No. 3,210,934, issued Oct. 12, 1965.

My present invention is directed to the provision of a simple, structurally sound, and aerodynamically efficient mixer for a turbofan engine, particularly one effective to minimize heat radiation through the engine exhaust pipe. In brief outline, this is accomplished by dividing the turbine exhaust into a number of exhausts spaced circumferentially around the axis of the engine and providing a mixer structure which masks these exhaust outlets from the jet propulsion nozzle and which additionally incorporates provision for circulation of cooling air from the fan duct through the mixer itself so as to maintain a relatively low temperature of the structure of the mixer which is visible through the jet nozzle.

The nature of my invention will be more clearly apparent from the succeeding detailed description of the preferred embodiment of the invention and the accompanying drawings thereof.

The principal objects of my invention are to provide a simple effective lightweight mixer structure for a turbofan engine or the like, to provide a mixer structure minimizing heat radiation from the engine exhaust pipe, and to provide a mixer structure which divides the turbine exhaust into a number of circumferentially distributed exhaust flows each of which is mixed with cooler air which serves to cool the mixing structure as well as reducing the temperature of the exhaust gases.

Referring to the drawings, FIG. 1 is a schematic illustration of a typical turbofan engine incorporating a mixer according to my invention.

Figure 1:
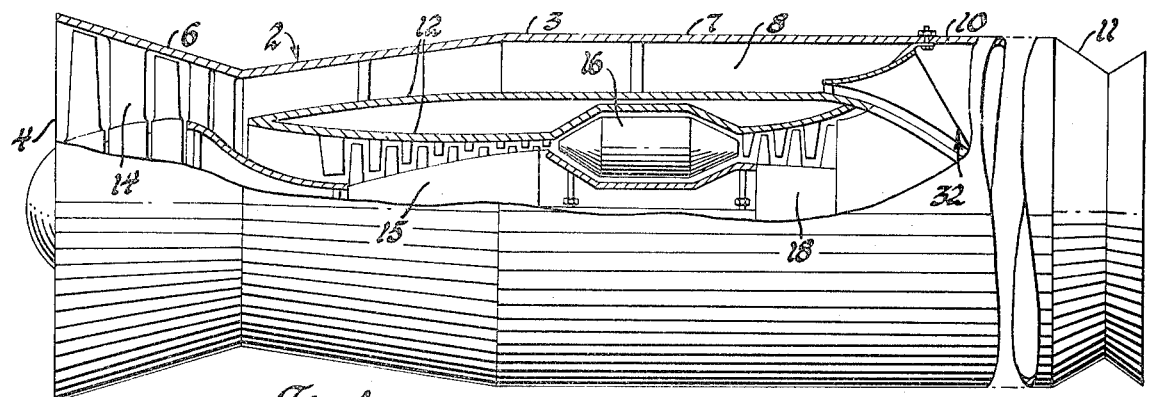

Referring first to FIG. 1, a jet propulsion engine 2 of the turbofan type includes an outer case 3 defining, sequentially from the air inlet 4 of the engine, the case 6 of a fan, the outer wall 7 of a bypass duct 8, and the wall 10 of an engine outlet type or tailpipe. The tailpipe terminates in a propulsion nozzle 11 which ordinarily is of a variable convergent or convergent-divergent type. A double inner wall structure 12 defines the inner boundary of the bypass duct 8 and the outer case of a gas turbine. Air flows from the air inlet 4 to the gas turbine through a fan 14, a compressor 15, combustion apparatus 16, and an axial-flow turbine 18. It is to be understood, of course, that the compressors and turbine may involve separate rotating members, the engine then being of a two- or three-spool type. Such matters are immaterial to my invention.

The exhaust gases from the turbine 18 and the air flowing through duct 8 are mixed prior to flow through the tailpipe 10 and the propulsion nozzle 11. A burner to heat the air in duct 8 might be provided, and an afterburner might be provided in the tailpipe 10. These also are immaterial to my invention.

Figure 2:
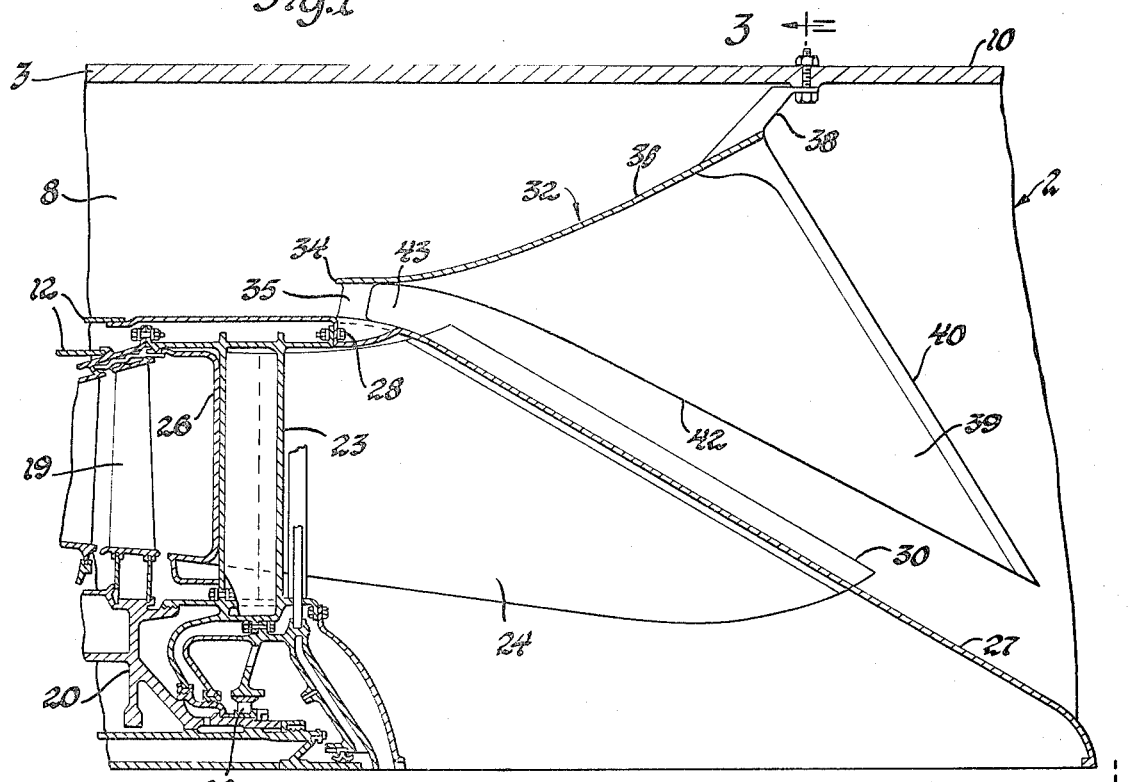
FIG. 2 is an enlarged sectional view of the mixer structure taken on a plane containing the axis of the engine.

Referring to FIG. 2, the final stage 19 of the turbine is shown as embodying a rotor structure 20 mounted in a bearing 22 supported from the wall 12 by a plural number of radiating struts 23. Six struts are preferred in this embodiment.

The hot exhaust gases from the turbine are discharged through six exhaust pipes 24, each exhaust pipe being disposed between two of the struts 23. The gaps between the exhaust pipes are closed by a fairing 26 extending around the front of each strut 23 and joining the side walls of adjacent exhaust pipes 24. The rear ends of the exhaust pipes extend through and are supported by a tailcone or fairing 27 which is fixed to the after end of the casing 12 by a ring of bolts 28. The tailcone 27 entirely closes off the annulus downstream of the turbine except for the outlets 30 of the exhaust pipes 24.

Figure 3:
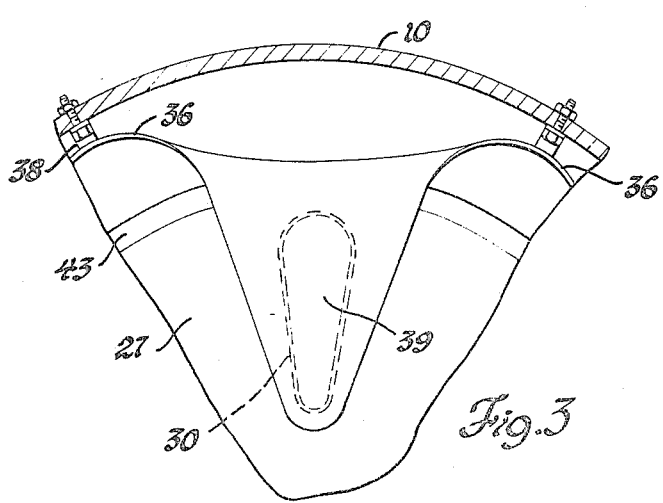
FIG. 3 is a partial transverse sectional view of the same taken on the plane indicated by the line 3—3 in FIG. 2.

The remaining principal part of the structure is a baffle 32 which is a generally annular structure disposed within the downstream end of the fan duct outer wall 7 and the upstream end of tailpipe 10 and outside of the tailcone 27. The baffle is a formed sheet metal structure, the preferred contours of which will be apparent from FIGS. 2 and 3.

The leading edge 34 of baffle 32 is spaced from wall 12 and supported by a number of struts 35 extending outward from the forward edge of the tailcone 27. From this point, the wall of the baffle extends rearwardly and outwardly, as indicated by the portions 36 in FIGS. 2 and 3, at six points disposed halfway between the outlets 30 so that it approaches the wall 10 and is supported from it by struts 38 bolted to the wall 10. Between the struts 38, the wall of the baffle is formed to provide six chutes or lobes 39 terminating at a trailing edge 40 and each having a rounded leading or inner edge 42 slightly spaced from the terminus of each turbine exhaust pipe 24.

The greater part of the bypass air, about eighty-five percent in the structure illustrated, flows outside of baffle 32 and largely through the chutes 39. The remainder of the bypass air flows through the annular opening 43 and then flows over the inner surface of the baffle. This flow of relatively cool bypass air over the baffle keeps it at a low temperature insufficient for undesirable radiation notwithstanding the presence of the turbine exhaust. The air flowing over the inner or forward face of the baffle provides a film cooling and shields the baffle from the turbine exhaust which emerges from the outlets 30. Air emerging from the outlets 30 flows around the rounded front or leading edge 42 of the baffle lobes and past each side of these baffle lobes through the spaces defined between the lobes by the outwardly diverging portions of the baffle. There is thus a first mixing of the turbine exhaust with a portion of the bypass air at the inner surface of the baffle and then a further mixing of this mixture which flows through the spaces between the lobes 39 with the remainder of the bypass air which flows through the lobes or chutes 39.

Since the baffle 32 is so disposed as to prevent direct sighting of the exhaust outlets 30 through the jet nozzle 11, and since the baffle is cooled by the bypass air flowing over its inner and outer surfaces, the result is a very low level of radiation. Some air may be circulated by conventional means through the interior of tailcone 27 to prevent its being heated to an undesired extent by radiation from the exhaust pipes 24.

It will be apparent to those skilled in the art that the structure described above is particularly well adapted to achieve the objects stated and is of simple and dependable as well as efficient structure.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. A jet propulsion engine comprising, in combination, a gas turbine having a gas discharge end, a bypass duct surrounding the turbine, means driven by the turbine operative to discharge air through the duct, a common outlet pipe for the turbine and bypass duct extending downstream therefrom, and means for mixing the air and gas and minimizing thermal radiation from the turbine through the duct comprising: a fairing enclosing the discharge end of the turbine, a plural number of circumferentially spaced exhaust pipes leading from the turbine discharge end through the fairing, a baffle extending around the fairing and spaced from the outlet pipe and fairing so as to define air passages extending over both inner and outer sides of the baffle, the baffle including lobes extending inwardly and downstream behind the exhaust pipes so as to hide the exhaust pipes from the outlet of the outlet pipe and allow the mixture of gas and air inside the baffle to flow rearwardly principally between adjacent lobes.

2. A jet propulsion engine comprising, in combination, a gas turbine having a gas discharge end, a bypass duct surrounding the turbine, means driven by the turbine operative to discharge air from the duct, a common outlet pipe for the turbine and bypass duct extending downstream therefrom, and means for mixing the air and gas and minimizing thermal radiation from the turbine through the duct comprising: a bulkhead enclosing the discharge end of the turbine, a plural number of circumferentially spaced exhaust pipes leading from the turbine discharge end through the bulkhead, a baffle extending around the bulkhead and spaced from the exhaust pipe and bulkhead so as to define air passages extending over both inner and outer sides of the baffle, the baffle including lobes extending inwardly and downstream behind the exhaust pipes so as to hide the exhaust pipes from the outlet of the outlet pipe and allow the mixture of gas and air inside the baffle to flow rearwardly principally between adjacent lobes, the baffle lobes having rounded leading edges disposed directly downstream of the respective exhaust pipes so as to split the exhaust flow and direct it around both sides of each lobe.

3. A jet propulsion engine comprising, in combination, a gas turbine engine including a turbine having a gas discharge end, a bypass duct surrounding the engine, means driven by the engine operative to discharge air through the duct, a common outlet pipe for the engine and bypass duct extending downstream therefrom, a jet propulsion nozzle at the downstream end of the outlet pipe, and means for mixing the air and gas and minimizing thermal radiation from the turbine through the propulsion nozzle comprising: a plural number of circumferentially spaced exhaust pipes leading from the turbine discharge end into the outlet pipe, the pipes terminating in rearwardly and outwardly directed outlets, a baffle extending around the exhaust pipe outlets and spaced from the exhaust pipe outlets and outlet pipe so as to define air passages extending over both inner and outer sides of the baffle receiving air from the bypass duct, the baffle including lobes extending inwardly and downstream behind the exhaust pipe outlets so as to hide the exhaust pipe outlets from the propulsion nozzle and allow the mixture of gas and air inside the baffle to flow rearwardly principally between adjacent lobes and to mix downstream of the baffle with the air flowing over the exterior of the lobes.

* * * * *